United States Patent [19]
MacMartin

[11] Patent Number: 5,360,302
[45] Date of Patent: Nov. 1, 1994

[54] INTERNAL IMPACTED SCREW-LOCKING PELLET

[75] Inventor: Malcolm J. MacMartin, Burbank, Calif.

[73] Assignee: California Institute of Technology, Pasadena, Calif.

[21] Appl. No.: 96,227

[22] Filed: Jul. 26, 1993

[51] Int. Cl.⁵ .................. F16B 13/04; F16B 39/02; F16B 39/34
[52] U.S. Cl. .................................. 411/23; 411/82; 411/294; 411/304
[58] Field of Search .......... 411/19, 21, 22, 23, 411/82, 257, 258, 254, 255, 294, 360, 302, 304

[56] References Cited

U.S. PATENT DOCUMENTS

| | | | |
|---|---|---|---|
| 299,447 | 5/1884 | Williams | 411/294 |
| 1,087,299 | 2/1914 | Kennedy | 411/21 |
| 1,921,794 | 8/1933 | Tomkinson | 411/23 |
| 3,319,209 | 5/1967 | Reyenga | 411/21 X |
| 3,434,743 | 3/1969 | Boeker | 411/999 X |
| 4,655,659 | 4/1987 | Lemke | 411/359 |
| 5,249,899 | 10/1993 | Wilson | 411/82 |

FOREIGN PATENT DOCUMENTS 1518577 10/1989 U.S.S.R. ............... 411/140

*Primary Examiner*—Neill R. Wilson
*Attorney, Agent, or Firm*—Michael L. Keller; Robert M. Wallace

[57] ABSTRACT

An elongate fastener having an engaging surface engageable with an engaging surface of a fastener's mate includes a hole extending through a portion of the fastener and having a top opening and a bottom floor, a locking pellet disposed near the bottom floor, a discharge channel communicating between the pellet and through the engaging surface of the fastener and opening out toward the engaging surface of the fastener's mate, and an impact pin in the hole having a top portion protruding through the top opening and a bottom portion near the locking pellet, whereby the pin drives the locking pellet through the discharge channel against the engaging surfaces of the fastener and the fastener's mate whereby to lock the fastener against the fastener's mate.

12 Claims, 1 Drawing Sheet

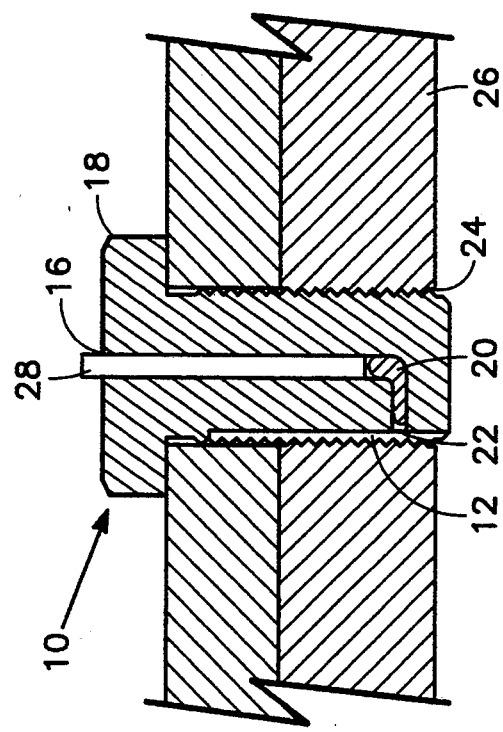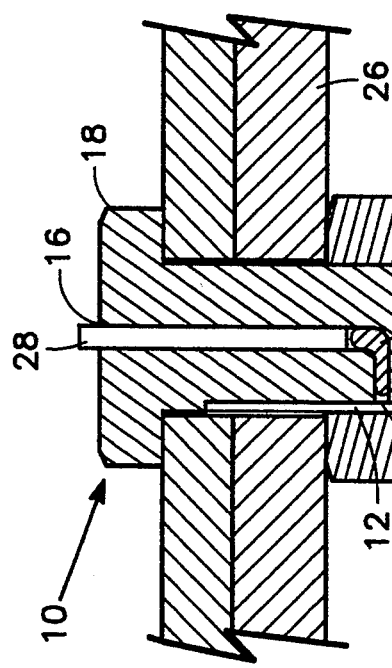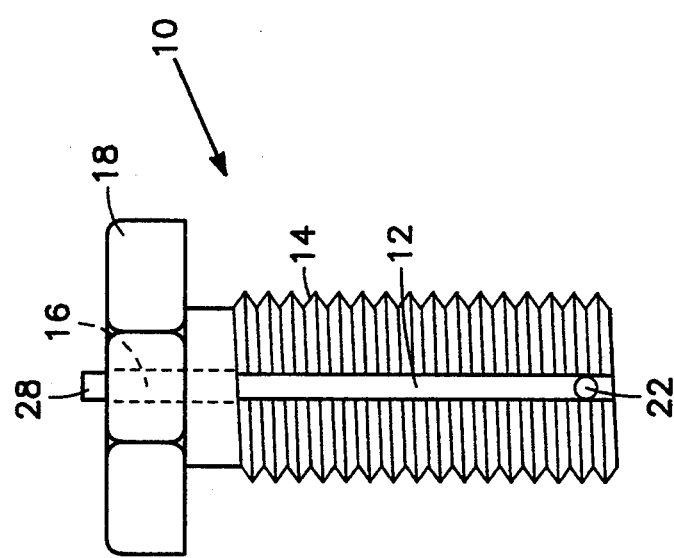

INTERNAL IMPACTED SCREW-LOCKING PELLET

ORIGIN OF THE INVENTION

The invention described herein was made in the performance of work under a NASA contract, and is subject to the provisions of Public Law 96-517 (35 USC 202) in which the Contractor has elected to retain title.

BACKGROUND OF THE INVENTION

1. Technical Field

The invention is related to mechanical screw-locking devices.

2. Background Art

Ordinary screw thread locks have a fixed feature which resists engagement to mating fasteners. Ordinary screw thread locks resist installation and can cause contamination due to shearing of locking material upon installation. What is needed is a screw locking device which suffers from none of the foregoing disadvantages but which nevertheless provides a positive lock against rotation of the screw once activated.

These and other objects and advantages of the invention will become apparent in the following detailed description when taken in conjunction with the accompanying drawings.

SUMMARY OF THE DISCLOSURE

The invention allows a fastener such as a threaded screw to be engaged without resistance from the locking feature. The locking device of the invention is a locking pellet of a malleable material inside the fastener or screw and a pin protruding above the screw-head which, upon impact, drives the pellet through a small external hole near the middle or bottom of the screw to engage with great force the interior surface of the female member in which the screw has been already inserted. An external longitudinal slot along the length of the screw which intersects the small external hole enables the pellet to spread out upon impact and engage a larger area of the female member external surface. The invention is applicable to threaded as well as unthreaded fasteners.

BRIEF DESCRIPTION OF THE DRAWINGS

FIG. 1 is a side view of a threaded screw embodying one aspect of the invention.

FIG. 2 is a cross-sectional side view illustrating the screw of FIG. 1 threaded into a female member and also showing the pellet and impact pin inside the screw.

FIG. 3 is a cross-sectional side view of an embodiment of the invention applicable to unthreaded fasteners.

DETAILED DESCRIPTION OF THE PREFERRED EMBODIMENTS

Referring to FIG. 1, a threaded screw 10 has a thin longitudinal external slot 12 interrupting its threads 14. Referring to FIG. 2, the screw 10 has a longitudinal hole 16 extending from the screw's head 18 through a major portion of its length. A pellet 20 of a malleable material (such as a soft metal or such as an impact-activated bonding agent) resides in the bottom of the hole 16 facing a small lateral opening 22 communicating with the hole 16 and opening out into the slot 12. After the screw has been threaded into a threaded hole 24 in a female member 26, a solid (metal) pin 28 inserted through the hole 16 so as to rest against the pellet 20 protrudes above the screw head and is impacted with a hammer, driving the pellet's malleable material through the lateral opening 22 and into the slot 12. This causes the pellet's material to lodge with great force against both the screw 10 and the female member 26, thereby locking the screw 10 in place. The pin 28 may be inserted into the hole 16 during manufacture of the screw 10 or later after the screw has been threaded into the female member 26.

FIG. 3 illustrates the invention as applied to an unthreaded fastener. All of the elements of FIG. 2 are present in FIG. 3, with the exception of the threads 14 on the screw 10 and mating threads on the female member 26.

While the invention has been described in detail by specific reference to preferred embodiments thereof, it is understood that variations and modifications thereof may be made without departing from the true spirit and scope of the invention.

What is claimed is:

1. An elongate fastener having an engaging surface engageable with an engaging surface of a fastener's mate, comprising:

a hole extending through a portion of said fastener and having a top opening and a bottom floor, said hole being aligned with a longitudinal axis of said elongate fastener;

a pellet of a locking material disposed near said bottom floor;

a thin elongate slot in the engaging surface of said fastener;

a discharge channel through said elongate fastener communicating between near the bottom of said hole and said slot and opening out toward said engaging surface of said fastener's mate; and an impact pin in said hole having a top portion protruding through said top opening and a bottom portion near said pellet, whereby said pin drives the locking material forming said pellet through said discharge channel, along at least pad of a length of the slot, and against the engaging surface of said fastener's mate whereby to lock said fastener against said fastener's mate.

2. The fastener of claim 1 wherein said fastener is a longitudinal member in which its engaging surface is an elongate cylinder, said fastener further comprising a head which protrudes above said fastener's mate upon said engaging surfaces being mutually engaged, said pin protruding above said head.

3. The fastener of claim 2 wherein said engaging surfaces comprise mutually engageable threads and wherein said slot comprises a thin elongate gap in the threads of said fastener.

4. The fastener of claim 1 wherein said locking material comprises a malleable material.

5. The fastener of claim 4 wherein said malleable material comprises a soft metal.

6. The fastener of claim 4 wherein said malleable material comprises an impact-activated bonding agent.

7. An elongate fastener having an engaging surface, comprising:

a hole extending through a portion of said fastener and having a top opening and a bottom floor, said hole being aligned with a longitudinal axis of said elongate fastener;

a pellet of a locking material disposed near said bottom floor;

a thin elongate slot in the engaging surface of said fastener;

a discharge channel through said elongate fastener communicating between near the bottom of said hole and said slot; and an impact pin in said hole having a top portion protruding through said top opening and a bottom portion near said pellet.

8. The fastener of claim 7 wherein said fastener is a longitudinal member in which its engaging surface is an elongate cylinder, said fastener further comprising a head, said pin protruding above said head.

9. The fastener of claim 8 wherein said engaging surface comprises threads and wherein said slot comprises a thin elongate gap in the threads.

10. The fastener of claim 7 wherein said locking material comprises a malleable material.

11. The fastener of claim 11 wherein said malleable material comprises a soft metal.

12. The fastener of claim 10 wherein said malleable material comprises an impact-activated bonding agent.

* * * * *